(12) United States Patent
Yoshida et al.

(10) Patent No.: US 7,638,218 B2
(45) Date of Patent: Dec. 29, 2009

(54) OPERATION CONTROL OF FUEL CELL SYSTEM

(75) Inventors: Naohiro Yoshida, Nisshin (JP); Tetsuya Bono, Miyoshi-cho (JP); Kenji Kurita, Nagoya (JP); Hiroaki Mori, Kasugai (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 761 days.

(21) Appl. No.: 11/270,741

(22) Filed: Nov. 10, 2005

(65) Prior Publication Data

US 2006/0110640 A1 May 25, 2006

Related U.S. Application Data

(63) Continuation of application No. PCT/JP2004/006361, filed on Apr. 30, 2004.

(30) Foreign Application Priority Data

May 14, 2003 (JP) .............................. 2003-135463

(51) Int. Cl.
*H01M 8/04* (2006.01)
*H01M 8/12* (2006.01)
(52) U.S. Cl. .............................. 429/25; 429/13; 429/34
(58) Field of Classification Search .................... 429/13, 429/25, 34
See application file for complete search history.

(56) References Cited

U.S. PATENT DOCUMENTS

2002/0094467 A1* 7/2002 Nonobe et al. ................. 429/34

(Continued)

FOREIGN PATENT DOCUMENTS

DE 102 01 893 A1 9/2002

(Continued)

*Primary Examiner*—Patrick Ryan
*Assistant Examiner*—Ben Lewis
(74) *Attorney, Agent, or Firm*—Oliff & Berridge, PLC

(57) ABSTRACT

In a fuel cell system of the invention, a pressure regulator is provided in the pathway of a hydrogen supply conduit that connects a hydrogen tank to a fuel cell stack. An anode off gas discharged from the fuel cell stack is recirculated through a recirculation pipe into the hydrogen supply conduit. A hydrogen pump is provided in the pathway of the recirculation pipe to increase the pressure of the anode off gas. A control unit of the fuel cell system includes a hydrogen pump control module, an abnormality diagnosis module, and an atmospheric pressure-based correction module. The hydrogen pump control module regulates the rotation speed of the hydrogen pump corresponding to a power demand to be output from the fuel cell system. The abnormality diagnosis module detects an abnormal state, based on a result of determination of whether the pressure of the hydrogen supply measured by a pressure sensor is within a certain range defined by two preset threshold values. The atmospheric pressure-based correction module corrects the rotation speed of the hydrogen pump and the threshold values used for abnormality diagnosis according to the atmospheric pressure measured by an atmospheric pressure sensor. Even in the state of unstable output of the pressure regulator with a variation of the atmospheric pressure, such correction compensates for the varying flow rate of the hydrogen supply to the fuel cell stack and thus effectively prevents misjudgment of abnormality diagnosis. Namely the technique of the invention reduces the potential effect of the varying pressure of the hydrogen supply to the fuel cell system with a variation of the atmospheric pressure.

9 Claims, 7 Drawing Sheets

U.S. PATENT DOCUMENTS

2004/0099048 A1 * 5/2004 Miura et al. .................. 73/49.2

FOREIGN PATENT DOCUMENTS

| DE | 102 22422 A1 | 1/2003 |
| DE | 102 00 058 A1 | 7/2003 |
| EP | 1 306 917 A2 | 5/2003 |
| JP | A-2001-345113 | 12/2001 |
| JP | A-2001-351654 | 12/2001 |
| JP | A-2002-056871 | 2/2002 |
| JP | A-2002-075418 | 3/2002 |
| JP | A-2002-352836 | 12/2002 |
| JP | A-2003-115309 | 4/2003 |
| JP | A-2003-142135 | 5/2003 |

* cited by examiner

Correction of Threshold Values for
Abnormality Diagnosis

Correction of Rotation Speed of
Hydrogen Pump

OPERATION CONTROL OF FUEL CELL SYSTEM

This is a Continuation of International Application No. PCT/JP2004/006361 filed Apr. 30, 2004, which claims the benefit of Japanese Patent Application No. 2003-135463 filed May 14, 2003. The entire disclosure of the prior applications is hereby incorporated by reference herein in its entirety.

BACKGROUND OF THE INVENTION

1. Field of the Invention

The present invention relates to a technique of controlling operations of a fuel cell system.

2. Description of the Related Art

Fuel cell systems generating electric power by an electrochemical reaction of hydrogen with oxygen have recently drawn attention as the novel energy source. The fuel cell system requires a supply of hydrogen for power generation. The hydrogen to be supplied to the fuel cell system is stored under pressure in a hydrogen tank and is depressurized to a preset pressure level by a pressure regulator, prior to the supply.

A typical example of the pressure regulator to depressurize the pressurized hydrogen is a diaphragm regulator. In the diaphragm regulator disclosed in Japanese Patent Laid-Open Gazette No. 2002-75418, the secondary supply pressure of hydrogen storage in a hydrogen tank is reduced to the atmospheric level by introducing the atmospheric pressure as a reference pressure into a diaphragm chamber.

The atmospheric pressure varies according to the altitude of the location of the fuel cell system and the climate conditions. In the conventional fuel cell system, the pressure of the hydrogen supply flowed out of the pressure regulator may be varied unstably. The varying pressure of the hydrogen supply may interfere with stable output of electric power. Even in the normal operation state of the fuel cell system, the varying pressure of the hydrogen supply may activate a safety device and lead to misjudgment of an abnormal state of the fuel cell system. Such misjudgment may cause significant troubles especially in moving bodies equipped with the fuel cell system, for example, motor vehicles, aircraft, and railway vehicles.

SUMMARY

The object of the invention is thus to eliminate the drawback of the prior art technique and to reduce the potential effect of the varying pressure of a hydrogen supply to a fuel cell system with a variation of the atmospheric pressure.

In order to attain at least part of the above and the other related objects, the present invention is directed to a fuel cell system including: a fuel cell stack that receives supplies of hydrogen and oxygen and generates electric power by an electrochemical reaction of the hydrogen and oxygen supplies; a hydrogen tank that stores hydrogen under a pressure of not lower than the atmospheric pressure, before the supply to the fuel cell stack; a hydrogen supply conduit that connects the hydrogen tank to the fuel cell stack; a pressure regulator that is provided in the pathway of the hydrogen supply conduit and utilizes the atmospheric pressure to reduce the pressure of the hydrogen supply from the hydrogen tank to the fuel cell stack; an atmospheric pressure measurement unit that measures the atmospheric pressure applied to the pressure regulator; and a control state change module that changes a preset control variable, which is involved in control of the fuel cell system, according to the measured atmospheric pressure, in order to reduce a potential effect of varying decompression performance of the pressure regulator with a variation of the atmospheric pressure.

There is an operation control method corresponding to the fuel cell system of the invention. Namely another application of the invention is an operation control method of a fuel cell system. The operation control method includes the steps of providing hydrogen storage under a pressure of not lower than the atmospheric pressure in a hydrogen tank to be supplied to a fuel cell stack, which receives supplies of hydrogen and oxygen and generates electric power by an electrochemical reaction of the hydrogen and oxygen supplies; reducing the pressure of the hydrogen supply from the hydrogen tank to the fuel cell stack by means of a pressure regulator, which is provided in the pathway of a hydrogen supply conduit connecting the hydrogen tank to the fuel cell stack and utilizes the atmospheric pressure for decompression of the hydrogen pressure; measuring the atmospheric pressure applied to the pressure regulator; and changing a preset control variable, which is involved in control of the fuel cell system, according to the measured atmospheric pressure, in order to reduce a potential effect of varying decompression performance of the pressure regulator with a variation of the atmospheric pressure.

In the fuel cell system of the invention and the operation control method of the fuel cell system, the correction variable involved in control of the fuel cell system is changed to reduce the potential effect of the varying decompression performance of the pressure regulator with a variation of the atmospheric pressure. The pressure regulator that reduces the pressure of the hydrogen supply by taking advantage of the atmospheric pressure is, for example, a pressure regulator valve or a relief valve.

In one preferable structure of the invention, the fuel cell system further includes: a hydrogen pressure measurement unit that is provided in the pathway of the hydrogen supply conduit and measures the pressure of the hydrogen supply between the pressure regulator and the fuel cell stack; and an abnormality diagnosis module that compares the measured pressure of the hydrogen supply with a preset threshold value for abnormality detection as the control variable to diagnose an abnormal state of the fuel cell system. In this embodiment, the control state change module varies the threshold value for abnormal detection with a variation of the atmospheric pressure.

Even in the state of the varying pressure of the hydrogen supply to the fuel cell stack with a variation of the atmospheric pressure, this arrangement effectively prevents misjudgment of the abnormal state by the abnormality diagnosis module.

In one preferable embodiment of the fuel cell system of the invention, the control variable is a flow rate of the hydrogen supply to the fuel cell stack, and the control state change module varies the flow rate of the hydrogen supply according to the measured atmospheric pressure.

This compensates for the varying hydrogen supply to the fuel cell stack with a variation of the atmospheric pressure.

In one applicable structure, the fuel cell system of this embodiment further includes: a recirculation pipe that connects an anode off gas outlet of the fuel cell stack to the hydrogen supply conduit to recirculate an anode off gas discharged from the fuel cell stack into the hydrogen supply conduit; a hydrogen pump that is provided in the pathway of the recirculation pipe to raise pressure of the anode off gas; and a hydrogen pump regulator that changes an operation condition of the hydrogen pump.

In this structure, the control state change module controls the hydrogen pump regulator to change the operation condition of the hydrogen pump according to the measured atmospheric pressure, so as to vary the flow rate of the hydrogen supply as the control variable.

The recirculation amount of hydrogen remaining in the anode off gas is controlled according to the atmospheric pressure. This compensates for the varying hydrogen supply to the fuel cell stack with a variation of the atmospheric pressure.

The fuel cell system of this structure may further include: an impurity concentration estimation module that estimates a concentration of an impurity included in the hydrogen supply, based on the measured atmospheric pressure; and a hydrogen pump operation change module that controls the hydrogen pump regulator to change the operation condition of the hydrogen pump according to the estimated concentration of the impurity.

The flow rate of the hydrogen supply is varied according to the estimated concentration of the impurity, for example, nitrogen or carbon dioxide, included in the hydrogen supply. In response to an increase in concentration of the impurity, the recirculation amount of the hydrogen supply is increased to compensate for an insufficiency of hydrogen. Such control is especially effective at a timing having a high probability that the hydrogen supply has a high level of the impurity, for example, at a start timing of the fuel cell system.

The concentration of the impurity included in the hydrogen supply may be estimated, based on a time elapsed since a stop of the fuel cell system and the measured atmospheric pressure at a time of activation of the fuel cell system. The concentration of the impurity included in the hydrogen supply can be estimated with high accuracy, based on the measured atmospheric pressure and the time elapsed since a stop of the fuel cell system. For example, a higher concentration of the impurity may be presumed against a longer time elapsed since the stop of the fuel cell system and against a higher level of the measured atmospheric pressure at the time of activation of the fuel cell system.

The diverse arrangements of the invention discussed above may be combined adequately or omitted partly according to the requirements. The technique of the invention is not restricted to the fuel cell system or the operation control method of the fuel cell system described above but is also applicable to a moving body equipped with such a fuel cell system and a control method of the moving body equipped with such a fuel cell system. Any of these applications may adopt any of the above diverse arrangements.

DESCRIPTION OF THE PREFERRED EMBODIMENTS

Figure 1:
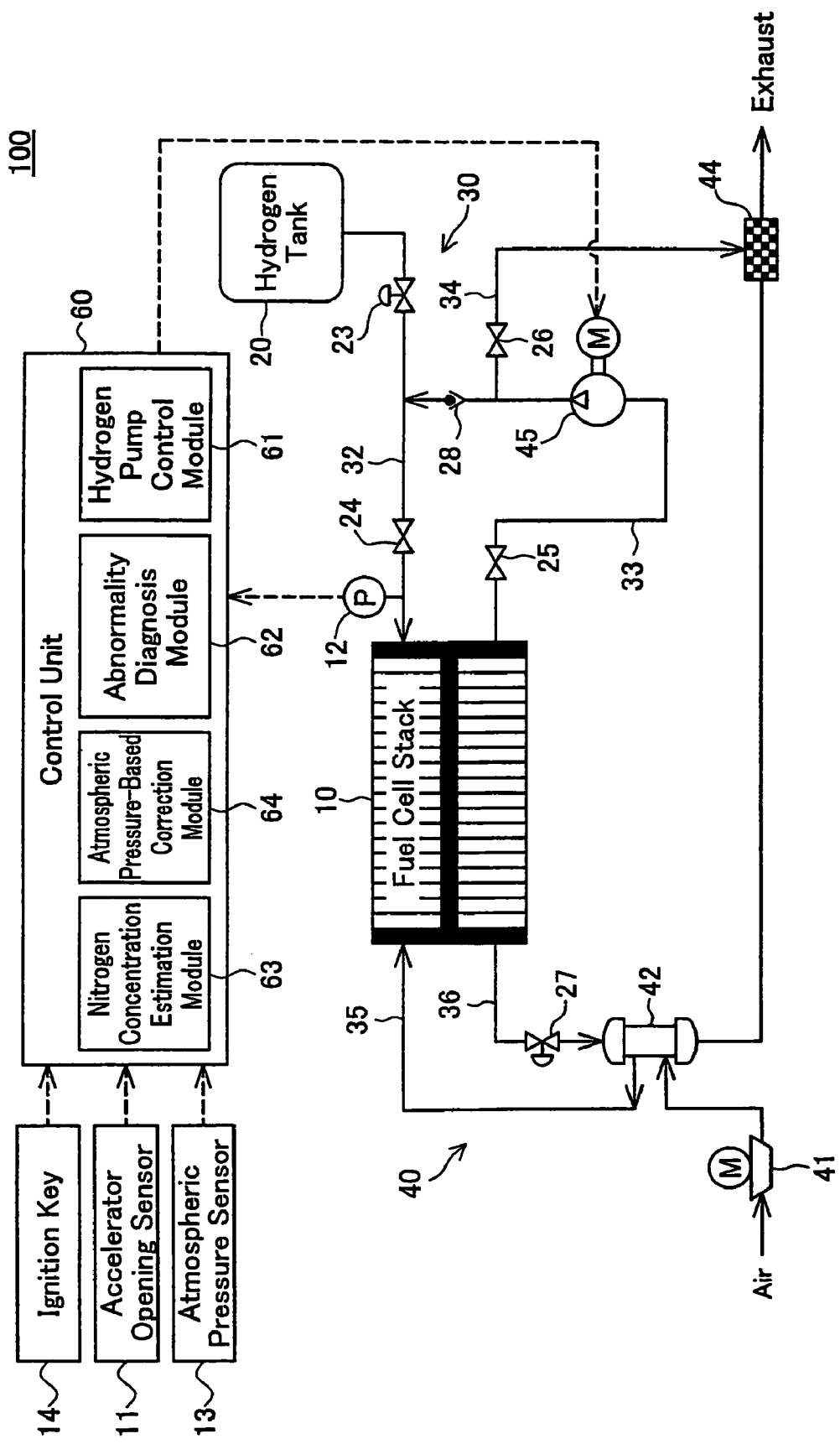
FIG. 1 schematically illustrates the configuration of a fuel cell system in one embodiment of the invention.

One mode of carrying out the invention is described below as a preferred embodiment in the following sequence:

A. General Configuration of Fuel Cell System
B. Control in Fuel Cell System
C. Operation Principle of Pressure Regulator
D. Atmospheric Pressure-Based Correction Process
E. Estimation Method of Nitrogen Concentration A. General Configuration of Fuel Cell System FIG. 1 schematically illustrates the configuration of a fuel cell system 100 in one embodiment of the invention. The fuel cell system 100 of the embodiment is mounted as a power source on an electric vehicle driven with a motor. When the driver turns an ignition key 14 on and depresses an accelerator, the fuel cell system 100 starts power generation according to the driver's depression amount of the accelerator measured by an accelerator opening sensor 11 and enables the electric vehicle to run with the generated electric power. The fuel cell system 100 is mounted on the motor vehicle in this embodiment, but may be mounted on diversity of other moving bodies including aircraft and railway vehicles or may be installed as stationary equipment in houses and other building constructions.

The fuel cell system 100 includes a stack of fuel cells or fuel cell stack 10, a hydrogen supply system 30 that supplies hydrogen as a fuel gas to the fuel cell stack 10, an oxygen supply system 40 that supplies oxygen in the form of the air, and a control unit 60 that controls the respective constituents of the fuel cell system 100. The fuel cell stack 10 is constructed as a laminate of multiple fuel cells (unit cells) that generate electric power by the electrochemical reaction of hydrogen with oxygen. Each unit cell has a hydrogen electrode (anode) and an oxygen electrode (cathode) arranged across an electrolyte membrane. The fuel cell of this embodiment is a polymer electrolyte fuel cell having a solid polymer film, such as a Nafion (registered trademark) film, applied to the electrolyte membrane.

The oxygen supply system 40 supplies the compressed air as an oxygen-containing gas to the cathodes of the fuel cell stack 10. The intake air is compressed by an air compressor 41, is humidified by a humidifier 42, and is flowed through an air conduit 35 to the cathodes of the fuel cell stack 10. The exhaust from the cathodes is discharged through an exhaust conduit 36, a pressure regulator 27, the humidifier 42, and a dilution unit 44 to the outside.

The hydrogen supply system 30 supplies the hydrogen gas from the hydrogen tank 20 through a hydrogen supply conduit 32 to the anodes of the fuel cell stack 10. The hydrogen gas stored under pressure in the hydrogen tank 20 is depressurized by a pressure regulator 23 and is flowed through a shut valve 24 to the anodes of the fuel cell stack 20. A pressure sensor 12 is provided in the pathway of the hydrogen supply conduit 32 between the pressure regulator 23 and the fuel cell stack 10 to measure the pressure of the hydrogen gas supplied to the fuel cell stack 10. The exhaust from the anodes (anode off gas) is discharged through a shut valve 25 and is flowed out to a recirculation pipe 33.

The recirculation pipe 33 diverges into two branches: one connecting with an exhaust conduit 34 to discharge the anode off gas to the outside and the other connecting with the hydrogen supply conduit 32 via a check valve 28. A hydrogen pump 45 is located in the recirculation pipe 33 to increase the pressure of the anode off gas. The anode off gas has the lowered pressure due to consumption of hydrogen in the process of power generation in the fuel cell stack 10. The anode off gas is pressurized to a required pressure level by the hydrogen pump 45 to be recirculated into the hydrogen supply conduit 32 via the check valve 28.

In the closed position of a discharge valve 26 located in the exhaust conduit 34, the anode off gas is recirculated to the fuel cell stack via the hydrogen supply conduit 32. The anode off gas has remaining hydrogen unconsumed in the power generation process. The recirculation of the anode off gas enhances the consumption efficiency of hydrogen.

Hydrogen remaining in the recirculated anode off gas is consumed for power generation, while the impurities of the anode off gas other than the remaining hydrogen, for example, nitrogen flowed from the cathodes to the anode side through the electrolyte membranes, are not consumed but are accumulated. Namely the concentration of the impurities gradually increases. In the fuel cell system 100 of the embodiment, the discharge valve 26 is opened at a preset timing to discharge the anode off gas having the high concentration of the impurities via the exhaust conduit 34. The anode off gas may still have a trace amount of hydrogen and is thus diluted with the air in the dilution unit 44 before the discharge to the outside. The discharge of the anode off gas significantly lowers the circulation amount of the impurities.

B. Control in Fuel Cell System

The operations of the fuel cell system 100 are under control of the control unit 60, which is constructed as a microcomputer including a CPU, a RAM, a ROM, and a timer. The CPU controls the operations of the respective constituents in the fuel cell system 100 according to a control program stored in the ROM. A hydrogen pump control module 61, an abnormality diagnosis module 62, an atmospheric pressure-based correction module 63, and a nitrogen concentration estimation module 64 illustrated as functional blocks in FIG. 1 are attained as the software configuration by the control program.

Figure 2:
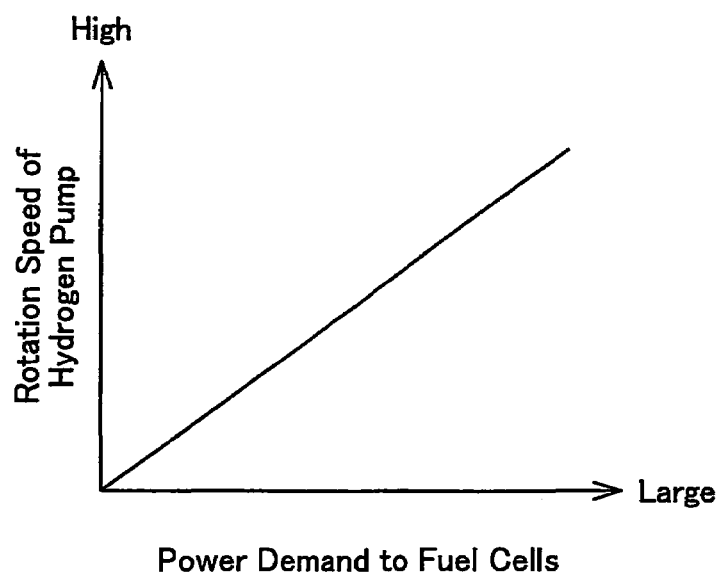
FIG. 2 shows regulation of a hydrogen pump by a control unit included in the fuel cell system.

The hydrogen pump control module 61 regulates the rotation speed of the hydrogen pump 45. The map of FIG. 2 shows regulation of the hydrogen pump 45. The hydrogen pump control module 61 raises the rotation speed of the hydrogen pump 45 to increase the supply of hydrogen with an increase in power demand to the fuel cell system 100.

Figure 3:
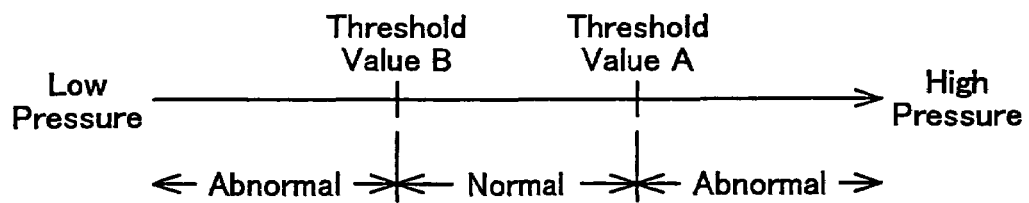
FIG. 3 shows diagnosis of an abnormal state by the control unit.

The abnormality diagnosis module 62 determines whether the fuel cell system 100 is in a normal state or in an abnormal state, based on the pressure of the hydrogen gas measured by the pressure sensor 12. FIG. 3 shows diagnosis of the abnormal state. The abnormality diagnosis module 62 determines that the fuel cell system 100 is in the abnormal state when the measured hydrogen pressure by the pressure sensor 12 increases to or over a preset threshold value A or decreases to or below a preset threshold value B. The threshold value A is higher than the threshold value B. The hydrogen pressure increases to or above the preset threshold value A, for example, when malfunction of the pressure regulator 23 leads to failed reduction of the hydrogen gas pressure to a preset level. The hydrogen pressure decreases to or below the preset threshold value B, on the other hand, when the hydrogen gas is leaked due to, for example, a crack in the recirculation pipe 33.

The atmospheric pressure-based correction module 63 corrects the rotation speed of the hydrogen pump 45 and the threshold values for abnormality diagnosis as control variables of the fuel cell system 100, according to the atmospheric pressure measured by an atmospheric pressure sensor 13. In the pressure regulator 23 of the embodiment, the atmospheric air is introduced into one of pressure chambers for pressure regulation. The pressure level of the depressurized hydrogen flowed out of the pressure regulator 23 varies with a variation of the atmospheric pressure. The atmospheric pressure-based correction module 63 corrects the rotation speed of the hydrogen pump 45 and the threshold values for abnormality diagnosis as the control variables, in order to reduce the potential effects due to the variation of the hydrogen pressure. The concrete procedure of correction will be described later.

The nitrogen concentration estimation module 64 estimates the concentration of nitrogen present on the anode side at the time of system activation, based on the atmospheric pressure measured by the atmospheric pressure sensor 13. The hydrogen pump 45 is controlled according to the estimated concentration of nitrogen at the time of system activation.

C. Operation Principle of Pressure Regulator

Figure 4:
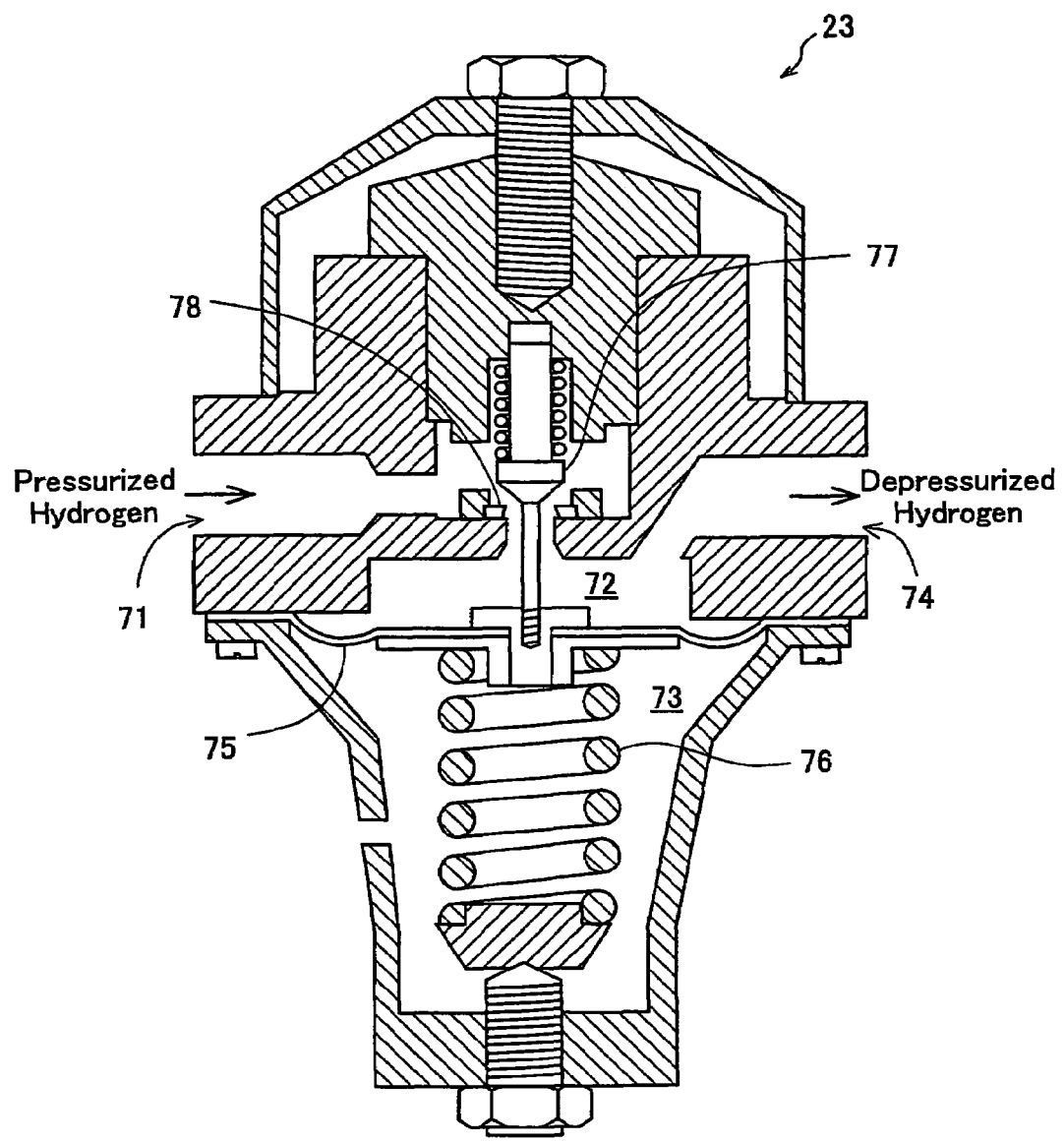
FIG. 4 shows the operation principle of a pressure regulator used in the fuel cell system.

FIG. 4 shows the operation principle of the pressure regulator 23. The pressure regulator 23 has a flow inlet 71 to receive a flow-in of the pressurized hydrogen gas, a decompression chamber 72 to lower the pressure of the hydrogen gas, an air chamber 73 to be filled with the atmospheric air, and a flow outlet 74 to give a flow-out of the depressurized hydrogen gas. The decompression chamber 72 is parted from the air chamber 73 by a diaphragm 75. The flow inlet 71 is connected to the hydrogen tank 20, and the flow outlet 74 is connected to the fuel cell stack 10 via the shut valve 24. The air chamber 73 is connected to the atmospheric air and has a spring 76 placed inside to press the diaphragm 75 up in the illustrated orientation of FIG. 4.

The pressurized hydrogen introduced from the flow inlet 71 flows through a space between a pressure regulator valve 77 and a seat 78 into the decompression chamber 72. The higher-pressure hydrogen flowed into the decompression chamber 72 presses the diaphragm 75 down in the illustrated orientation of FIG. 4 and draws down in the illustrated orientation of FIG. 4 the pressure regulator valve 77 linked with the diaphragm 75. The space between the pressure regulator valve 77 and the seat 78 is thus narrowed to increase a pressure loss relative to the flow rate of hydrogen and thereby lowers the pressure of hydrogen flowed out of the flow outlet 74. The lower-pressure hydrogen flowed into the decompression chamber 72, on the other hand, causes the diaphragm 75 to be pressed up in the illustrated orientation of FIG. 4 by the total of the atmospheric pressure and the pressing force of the spring 76. The space between the pressure regulator valve 77 and the seat 78 is thus widened to decrease the pressure loss relative to the flow rate of hydrogen and thereby heightens the pressure of hydrogen flowed out of the flow outlet 74. The pressure regulator 23 is designed to substantially equalize the pressure of the hydrogen gas flowed out of the flow outlet 74, based on the balance between the pressure of the flow-in hydrogen and the total of the atmospheric pressure and the pressing force of the spring 76.

D. Atmospheric Pressure-Based Correction Process

The pressure regulator 23 of this embodiment utilizes the balance between the pressure of the hydrogen gas and the total of the atmospheric pressure and the pressing force of the spring 76 for decompression of the hydrogen gas. This pressure balance is affected by the variation of the atmospheric pressure. When the electric vehicle equipped with the fuel cell system 100 runs in the high altitude, the lowered atmospheric pressure decreases the force of pressing up the diaphragm 75. The forces applied to the diaphragm 75 are accordingly balanced at a lower pressure level in the decompression chamber 72. This narrows the space between the pressure regulator valve 77 and the seat 78 and leads to the decreased pressure level of the flow-out hydrogen. When the electric vehicle equipped with the fuel cell system 100 runs in the low altitude, on the other hand, the raised atmospheric pressure leads to the increased pressure level of the flow-out hydrogen. In the fuel cell system 100 including the pressure regulator 23 that reduces the pressure of the hydrogen supply by taking advantage of the atmospheric pressure, the flow rate of hydrogen supplied to the fuel cell stack 10 varies with a variation of the atmospheric pressure. In the structure of this embodiment, the rotation speed of the hydrogen pump 45 is regulated according to the variation of the atmospheric pressure measured by the atmospheric pressure sensor 13. Such regulation of the rotation speed effectively compensates for the varying hydrogen supply to the fuel cell stack 10 by the pressure regulator 23.

Even in the normal operation state of the fuel cell system 100, the variation in pressure of the hydrogen supply to the fuel cell stack 10 with the varying atmospheric pressure may cause the abnormality diagnosis module 62 to misjudge an abnormal state based on the settings of the threshold values. The control procedure of this embodiment thus changes the threshold values A and B according to the variation of the atmospheric pressure measured by the atmospheric pressure sensor 13, as described below.

Figure 5:
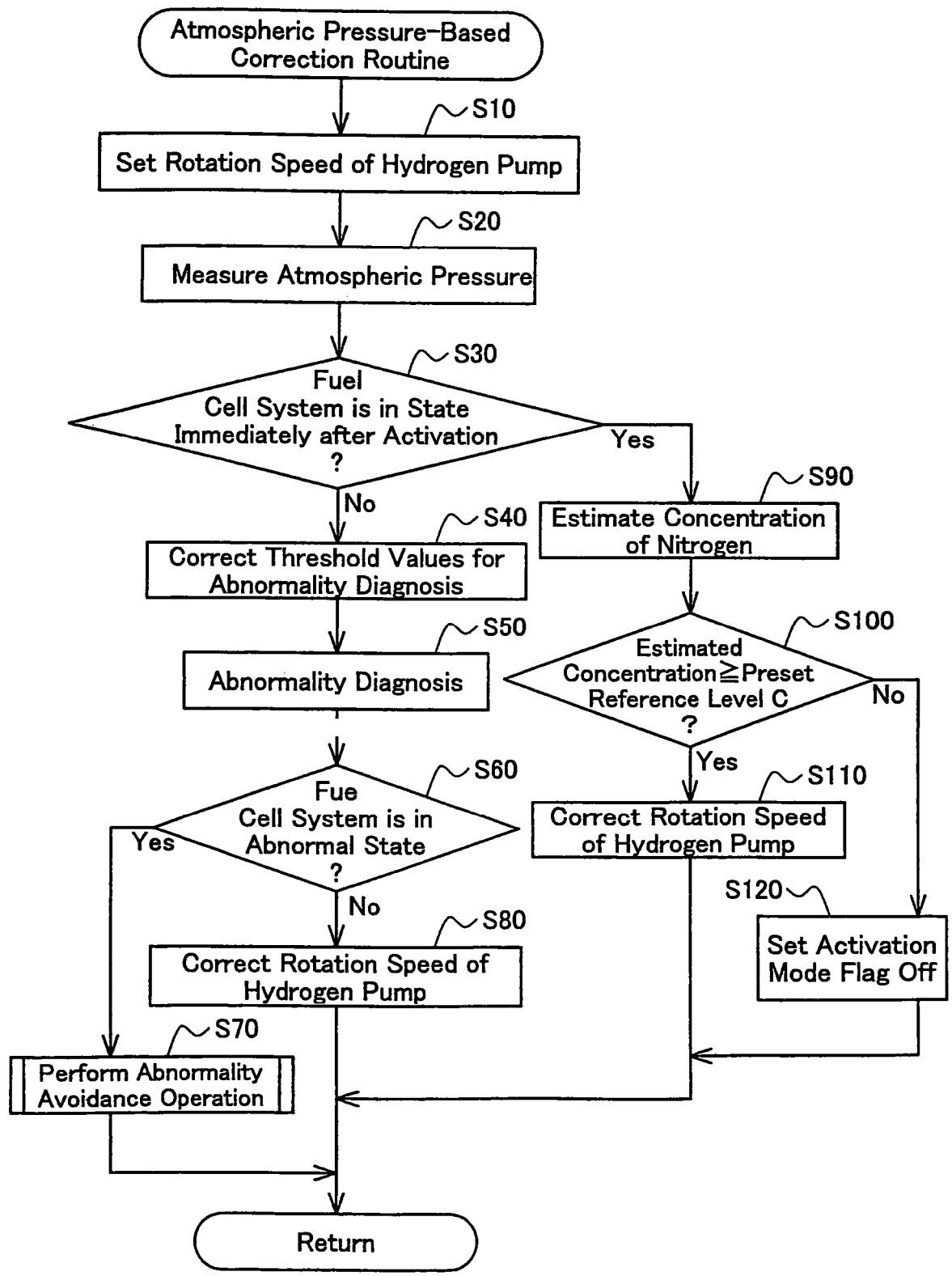
FIG. 5 is a flowchart showing an atmospheric pressure-based correction routine executed by the control unit.

FIG. 5 is a flowchart showing an atmospheric pressure-based correction routine executed by the control unit 60. The control unit 60 refers to the map of FIG. 2 and sets the rotation speed of the hydrogen pump 45 according to a power demand to be output from the fuel cell system 100 (step S10), and controls the atmospheric pressure sensor 13 to measure the atmospheric pressure (step S20).

The control unit 60 then determines whether the fuel cell system 100 is in the state immediately after activation (step S30). The state immediately after activation is detected when an activation mode flag recorded in the RAM of the control unit 60 is ON (is equal to 1). The activation mode flag is set equal to 1 in response to activation of the fuel cell system 100 by turning the ignition key 14 on.

Figure 6:
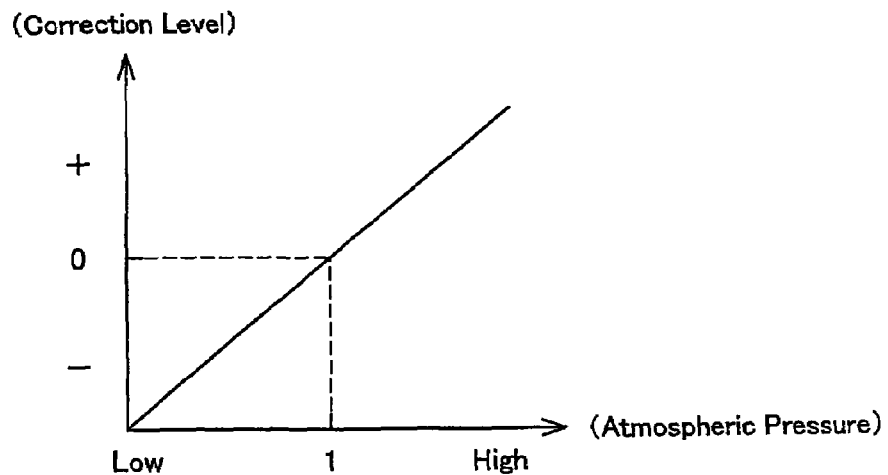
FIG. 6 shows correction of threshold values for abnormality diagnosis.

When it is determined that the fuel cell system 100 is not in the state immediately after activation, that is, in response to a negative answer of step S30, the control unit 60 corrects the threshold values A and B for abnormality diagnosis shown in FIG. 3 according to the atmospheric pressure measured at step S20 (step S40). FIG. 6 shows correction of the threshold values A and B for abnormality diagnosis. When the measured atmospheric pressure is higher than a predetermined level, for example, 1 atm, the threshold values A and B are shifted up by an identical amount. When the measured atmospheric pressure is lower than 1 atm, on the other hand, the threshold values A and B are shifted down by an identical amount. Even in the state of the varying hydrogen pressure output from the pressure regulator 23, such correction effectively prevents the variation of the hydrogen pressure from being ascribed to malfunction of the pressure regulator or to crack of the recirculation pipe 33. The control procedure of this embodiment shifts up or shifts down the threshold values A and B by the identical amount. These threshold values may, however, be shifted up or shifted down by different amounts according to the requirements.

The control unit 50 compares the pressure of the hydrogen supply measured by the pressure sensor 12 with the corrected threshold values A and B and determines whether the fuel cell system 100 is in the normal state or in the abnormal state as shown in FIG. 3 (step S50). In response to detection of an abnormal state, that is, in response to an affirmative answer at step S60, a specified abnormality avoidance operation is performed (step S70). The specified abnormality avoidance operation, for example, stops the fuel cell system 100 or gives an alarm to the driver of the vehicle.

Figure 7:
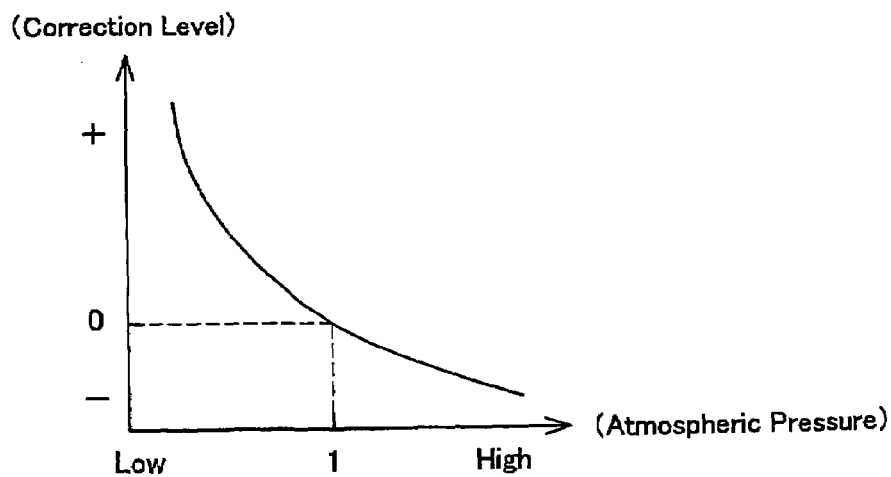
FIG. 7 shows correction of the rotation speed of the hydrogen pump.

In response to detection of a normal state, that is, in response to a negative answer at step S60, on the other hand, the control unit 60 corrects the rotation speed of the hydrogen pump 45 set at step S10 according to the atmospheric pressure measured at step S20 (step S80). FIG. 7 shows correction of the rotation speed of the hydrogen pump 45. The control procedure of this embodiment decreases the rotation speed of the hydrogen pump 45 with an increase of the atmospheric pressure over 1 atm, while increasing the rotation speed of the hydrogen pump 45 with a decrease of the atmospheric pressure below 1 atm. Such correction compensates for the varying flow rate of the hydrogen supply from the pressure regulator 23.

These corrections based on the variation of the measured atmospheric pressure are performed continually during activation of the fuel cell system 100 to reduce diversity of effects arising with the variation of the atmospheric pressure. The pressure regulator 23 used in the structure of the embodiment gives the higher hydrogen pressure against the higher atmospheric pressure. The pressure regulator may alternatively be designed to have the atmospheric pressure act in the opposite direction on the pressure regulator valve 77. In the pressure regulator of this alternative design, the variations in secondary pressure of hydrogen against the atmospheric pressure show reverse tendencies to those of FIGS. 6 and 7. In application of this pressure regulator, the control procedure refers to preset maps representing reverse variations of the threshold value for abnormality diagnosis and the rotation speed of the hydrogen pump against the atmospheric pressure and specifies the respective correction levels.

The atmospheric pressure-based correction process of this embodiment follows a different processing flow, in response to an affirmative answer at step S30, that is, in the state of the fuel cell system 100 immediately after activation. This is because the high concentration of nitrogen and other impurities included in the hydrogen gas may cause an insufficient level of hydrogen partial pressure for power generation at the time of system activation.

When the fuel cell system 100 is in the state immediately after activation, that is, in response to an affirmative answer at step S30, the control unit 60 estimates the concentration of nitrogen contained in the hydrogen gas, based on the atmospheric pressure measured at step S20 (step S90). The detailed process of estimation is described later.

The control unit 60 then compares the estimated concentration of nitrogen with a preset reference value C (step S100). When the estimated concentration of nitrogen is not lower than the preset reference value C, the rotation speed of the hydrogen pump 45 is corrected to a higher level than the ordinary level (step S110). When the estimated concentration of nitrogen is lower than the preset reference value C, the control unit 60 does not correct the rotation speed of the hydrogen pump 45 but sets the activation mode flag off (step S120).

Any of diverse techniques may be applied to correct the rotation speed of the hydrogen pump 45 at step S110. For example, the rotation speed of the hydrogen pump 45 may be fixed to a preset level or may be increased at a constant rate when the estimated concentration of nitrogen is not lower than the preset reference value C. The rotation speed of the hydrogen pump 45 may be raised with an increase of the estimated concentration of nitrogen. The control procedure of this embodiment corrects the rotation speed of the hydrogen pump 45 when the estimated concentration of nitrogen is not lower than the preset reference value C. One possible modification may vary the rotation speed of the hydrogen pump 45 according to the estimated concentration of nitrogen without the comparison with the preset reference value C.

As described above, the higher rotation speed of the hydrogen pump 45 under the condition of the high nitrogen concentration at the time of system activation enables a higher flow of hydrogen to be circulated to the anodes of the fuel cell stack 10 and lowers the hydrogen partial pressure.

The series of correction process is terminated on conclusion of either step S110 or step S120 in the flowchart of FIG. 5. One possible modification may return the processing flow to step S40 after step S110 or step S120. Instead of or in addition to the correction of the rotation speed of the hydrogen pump 45 at step S110, the discharge valve 26 may be controlled to flow out the anode off gas. The discharge of nitrogen naturally heightens the concentration of hydrogen in the hydrogen gas.

E. Estimation Method of Nitrogen Concentration

Figure 8:
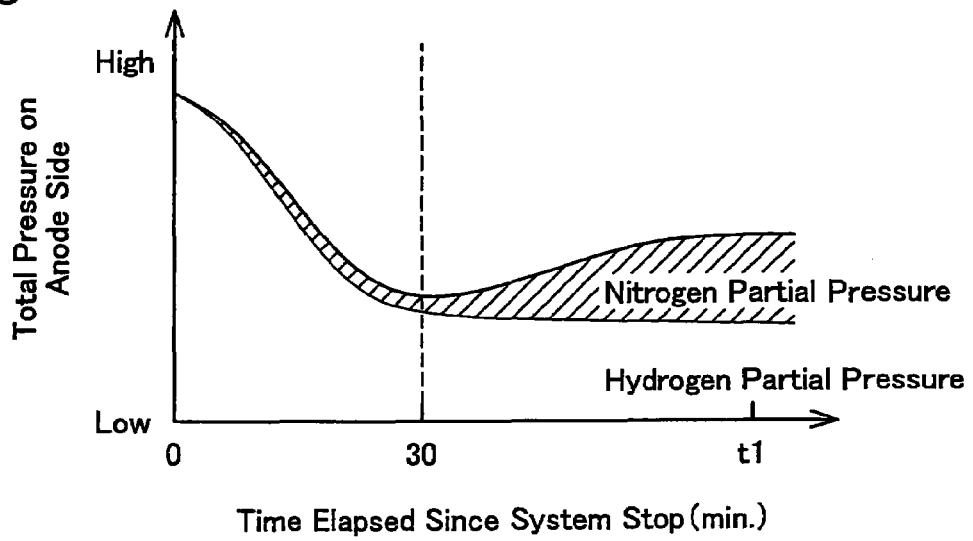
FIG. 8 is a graph showing a pressure change on an anode side against the time elapsed since a stop of the fuel cell system.

The method of estimating the concentration of nitrogen at step S90 is described with reference to FIGS. 8 to 10. FIG. 8 is a graph showing a pressure change on the anode side after stop of the fuel cell system 100. The change of the total pressure on the anode side is plotted as ordinate and the time elapsed since the stop of the fuel cell system 100 as abscissa. The total pressure on the anode side gradually decreases after the stop of the fuel cell system 100. The gradual decrease of the total pressure is ascribed to the transfer of hydrogen from the anodes to the cathodes through the electrolyte membranes in the fuel cell stack 10. The total pressure on the anode side starts increasing after elapse of 30 minutes since the stop of the fuel cell system 100. This increase of the total pressure is ascribed to the gradual transmission of nitrogen included in the air from the cathode to the anode via the electrolyte membranes. This pressure change is stored in advance in the form of a map in the control unit 60. The control unit 60 refers to the map and estimates the nitrogen partial pressure (nitrogen concentration) on the anode side according to the time elapsed since the stop of the fuel cell system 100. The total pressure and the nitrogen partial pressure on the anode side are, however, affected by the atmospheric pressure in the actual state and are thus subject to regulation discussed below.

Figure 9:
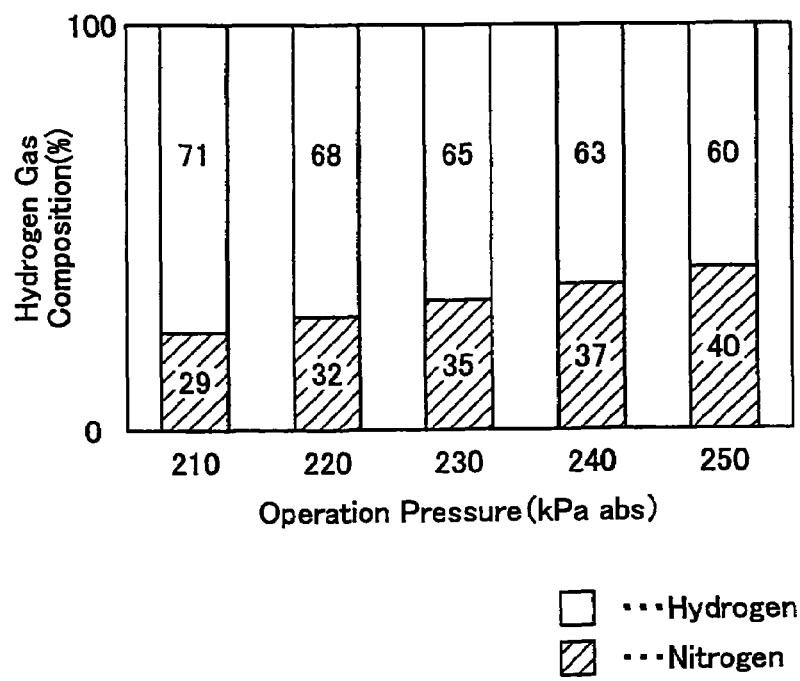
FIG. 9 is a graph showing a variation in hydrogen gas composition against the operation pressure.
Figure 10:
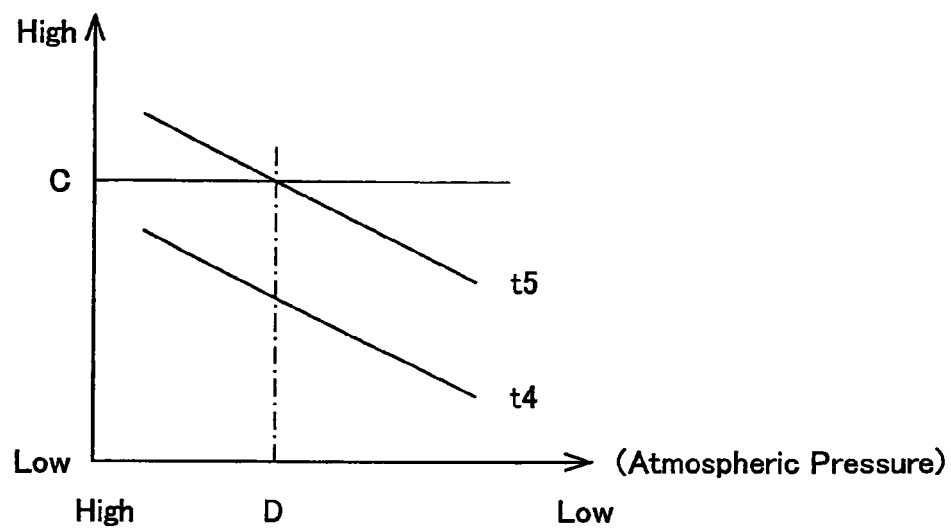
FIG. 10 is a map used to estimate the concentration of nitrogen according to the variation of the atmospheric pressure and the time elapsed since the stop of the fuel cell system.

FIG. 9 is a graph showing a variation in hydrogen gas composition against the operation pressure on activation of the fuel cell system 100 at a time point t1 in FIG. 8. The operation pressure on the anode side at the time of system activation is generally set to about 250 kPa by the pressure regulator 23. As described above, with a decrease of the atmospheric pressure, the hydrogen pressure output from the pressure regulator 23 is lowered to reduce the operation pressure from 250 kPa. The decreasing atmospheric pressure also lowers the amount of nitrogen transmitted from the cathodes to the anodes during the stop of the fuel cell system 100. The rate of nitrogen included in the hydrogen gas is thus lowered with a decrease of the operation pressure as shown in FIG. 9.

The concentration of nitrogen at the time of system activation is estimable according to the time elapsed since the stop of the fuel cell system 100 and the atmospheric pressure on the system activation. The procedure of this embodiment refers to a map of FIG. 10 stored in the control unit 60 and estimates the concentration of nitrogen. FIG. 10 is a map used to estimate the concentration of nitrogen according to the variation of the atmospheric pressure and the time elapsed since the stop of the fuel cell system 100. The concentration of nitrogen is plotted as ordinate and the variation of the atmospheric pressure as abscissa. The symbol 'C' in the map of FIG. 10 is equivalent to the preset reference value C to be compared with the estimated concentration of nitrogen at step S100 in the flowchart of FIG. 5. When the estimated concentration of nitrogen is not lower than the preset reference value C, the control unit 60 increases the rotation speed of the hydrogen pump 45. In the illustrated example of FIG. 10, when the elapsed time is t4, the concentration of nitrogen is kept in a sufficiently low level over the variation of the atmospheric pressure. This does not require correction of the rotation speed of the hydrogen pump 45. When the elapsed time is t5, on the other hand, the nitrogen partial pressure on the anode side is significantly high in the atmospheric pressure of not lower than a specified level D. The rotation speed of the hydrogen pump 45 is thus to be corrected to a higher level. The increased rotation speed of the hydrogen pump 45 discharges the hydrogen gas containing a high concentration of nitrogen from the anodes and promptly lowers the nitrogen partial pressure to facilitate the system activation. In the atmospheric pressure of lower than the specified level D, the sufficiently low operation pressure on the anode side leads to a sufficiently low rate of nitrogen included in the hydrogen gas. This does not require correction of the rotation speed of the hydrogen pump 45.

The estimation method of nitrogen concentration as described above enables accurate control of the hydrogen pump 45 and thus ensures effective activation of the fuel cell system 100.

The embodiment and its modified examples discussed above are to be considered in all aspects as illustrative and not restrictive. There may be many other modifications, changes, and alterations without departing from the scope or spirit of the main characteristics of the present invention. For example, the functions attained by the software configuration may be actualized by the hardware configuration.

What is claimed is:

1. A fuel cell system, comprising:
   a fuel cell stack that receives supplies of hydrogen and oxygen and generates electric power by an electrochemical reaction of the hydrogen and oxygen supplies;
   a hydrogen tank that stores hydrogen under a pressure of not lower than the atmospheric pressure, before the supply to the fuel cell stack;
   a hydrogen supply conduit that connects the hydrogen tank to the fuel cell stack;
   a pressure regulator that is provided in a pathway of the hydrogen supply conduit and utilizes the atmospheric pressure to reduce the pressure of the hydrogen supply from the hydrogen tank to the fuel cell stack;
   an atmospheric pressure measurement unit that measures the atmospheric pressure applied to the pressure regulator; and
   a control state change module that changes a preset control variable, which is involved in control of said fuel cell system, according to the measured atmospheric pressure, in order to reduce a potential effect of varying decompression performance of the pressure regulator with a variation of the atmospheric pressure.

2. A fuel cell system in accordance with claim 1, said fuel cell system further comprising:
- a hydrogen pressure measurement unit that is provided in the pathway of the hydrogen supply conduit and measures the pressure of the hydrogen supply between the pressure regulator and the fuel cell stack; and
- an abnormality diagnosis module that compares the measured pressure of the hydrogen supply with a preset threshold value for abnormality detection as the control variable to diagnose an abnormal state of said fuel cell system,
- wherein said control state change module varies the threshold value for abnormal detection with a variation of the atmospheric pressure.

3. A fuel cell system in accordance with claim 1, wherein the control variable is a flow rate of the hydrogen supply to the fuel cell stack, and
- said control state change module varies the flow rate of the hydrogen supply according to the measured atmospheric pressure.

4. A fuel cell system in accordance with claim 3, said fuel cell system further comprising:
- a recirculation pipe that connects an anode off gas outlet of the fuel cell stack to the hydrogen supply conduit to recirculate an anode off gas discharged from the fuel cell stack into the hydrogen supply conduit;
- a hydrogen pump that is provided in the pathway of the recirculation pipe to raise pressure of the anode off gas; and
- a hydrogen pump regulator that changes an operation condition of the hydrogen pump,
- wherein said control state change module controls the hydrogen pump regulator to change the operation condition of the hydrogen pump according to the measured atmospheric pressure, so as to vary the flow rate of the hydrogen supply as the control variable.

5. A fuel cell system in accordance with claim 4, said fuel cell system further comprising:
- an impurity concentration estimation module that estimates a concentration of an impurity included in the hydrogen supply, based on the measured atmospheric pressure; and
- a hydrogen pump operation change module that controls the hydrogen pump regulator to change the operation condition of the hydrogen pump according to the estimated concentration of the impurity.

6. A fuel cell system in accordance with claim 5, wherein said hydrogen pump operation change module controls the hydrogen pump regulator to increase an operation level of the hydrogen pump with an increase in estimated concentration of the impurity, so as to enhance a degree of the pressure increase of the anode off gas.

7. A fuel cell system in accordance with claim 5, wherein said impurity concentration estimation module estimates the concentration of the impurity included in the hydrogen supply, based on a time elapsed since a stop of said fuel cell system and the measured atmospheric pressure at a time of activation of said fuel cell system.

8. A fuel cell system in accordance with claim 7, wherein said impurity concentration estimation module presumes a higher concentration of the impurity against a longer time elapsed since the stop of said fuel cell system and against a higher level of the measured atmospheric pressure at the time of activation of said fuel cell system.

9. An operation control method of a fuel cell system, said operation control method comprising:
- providing hydrogen storage under a pressure of not lower than the atmospheric pressure in a hydrogen tank to be supplied to a fuel cell stack, which receives supplies of hydrogen and oxygen and generates electric power by an electrochemical reaction of the hydrogen and oxygen supplies;
- reducing the pressure of the hydrogen supply from the hydrogen tank to the fuel cell stack by means of a pressure regulator, which is provided in the pathway of a hydrogen supply conduit connecting the hydrogen tank to the fuel cell stack and utilizes the atmospheric pressure for decompression of the hydrogen pressure;
- measuring the atmospheric pressure applied to the pressure regulator; and
- changing a preset control variable, which is involved in control of said fuel cell system, according to the measured atmospheric pressure, in order to reduce a potential effect of varying decompression performance of the pressure regulator with a variation of the atmospheric pressure.

* * * * *